(12) United States Patent
Rofougaran et al.

(10) Patent No.: US 11,757,522 B2
(45) Date of Patent: *Sep. 12, 2023

(54) MANAGING A NETWORK OF RADIO FREQUENCY (RF) REPEATER DEVICES

(71) Applicant: AR & NS Investment, LLC, Newport Coast, CA (US)

(72) Inventors: Ahmadreza Rofougaran, Newport Beach, CA (US); Arman Rofougaran, Newport Coast, CA (US); Alireza Tarighat Mehrabani, Los Angeles, CA (US)

(73) Assignee: AR & NS Investment, LLC, Newport Coast, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,814

(22) Filed: Dec. 20, 2022

(65) Prior Publication Data

US 2023/0127429 A1 Apr. 27, 2023

Related U.S. Application Data

(63) Continuation of application No. 17/409,128, filed on Aug. 23, 2021, now Pat. No. 11,637,618, which is a continuation of application No. 16/911,036, filed on Jun. 24, 2020, now Pat. No. 11,177,872.

(51) Int. Cl.
*H04W 4/029* (2018.01)
*H04B 7/155* (2006.01)

(52) U.S. Cl.
CPC ........ *H04B 7/15507* (2013.01); *H04W 4/029* (2018.02)

(58) Field of Classification Search
CPC ...................................... H04W 4/029
USPC ......................... 370/338, 329, 345, 252, 350
See application file for complete search history.

(56) References Cited

PUBLICATIONS

Notice of Allowance for U.S. Appl. No. 17/819,894 dated Mar. 22, 2023.
Corrected Notice of Allowance for U.S. Appl. No. 16/910,291 dated Feb. 14, 2023.
Corrected Notice of Allowance for U.S. Appl. No. 17/409,128 dated Jan. 25, 2023.
Corrected Notice of Allowance for U.S. Appl. No. 17/409,128 dated Mar. 7, 2023.

(Continued)

*Primary Examiner* — Joseph Arevalo
(74) *Attorney, Agent, or Firm* — CHIP LAW GROUP

(57) ABSTRACT

A system includes control circuitry that obtains data from a repeater device of a network of repeater devices. A plurality of signal propagation indicators is determined, and a three-dimensional representation of a geographical area is generated based on the obtained data and the determined plurality of signal propagation indicators. The obtained data includes information of movement of a plurality of objects in the geographical area. A location and movement of a plurality of user devices is tracked and a beamforming scheme is selected for one or more repeater devices based on the generated three-dimensional representation and the movement of the plurality of objects. An out-of-band control of operations of the network of repeater devices is executed based on the generated three-dimensional representation, the selected beamforming scheme, the movement of the plurality of objects, and the tracked location and movement of the plurality of user devices.

20 Claims, 5 Drawing Sheets

(56) References Cited

PUBLICATIONS

Corrected Notice of Allowance for U.S. Appl. No. 17/563,168 dated Jan. 27, 2023.
Corrected Notice of Allowance for U.S. Appl. No. 17/563,168 dated Mar. 7, 2023.
Non-Final Office Action for U.S. Appl. No. 16/910,537 dated Feb. 2, 2023.

MANAGING A NETWORK OF RADIO FREQUENCY (RF) REPEATER DEVICES

CROSS-REFERENCE TO RELATED APPLICATIONS/INCORPORATION BY REFERENCE

This patent application makes reference to, claims priority to, claims the benefit of, and is a Continuation application of U.S. patent application Ser. No. 17/409,128, filed Aug. 22, 2021, which is a Continuation application of U.S. Pat. No. 11,177,872, issued on Nov. 16, 2021.

The above referenced applications are hereby incorporated herein by reference in their entirety.

FIELD OF TECHNOLOGY

Certain embodiments of the disclosure relate to communication systems. More specifically, certain embodiments of the disclosure relate to a system and method for managing a network of radio frequency (RF) repeater devices.

BACKGROUND

Currently, next generation of wireless telecommunication technologies, for example, current 5G (both non-standalone or standalone), upcoming 6G, or advanced Wi-Fi systems, are being developed to deliver much faster data rate as compared to long term evolution (LTE or 4G) or existing Wi-Fi-based technology. However, still there are many technical problems in conventional communication systems that contribute to inefficient communication, such as coverage blackspot, low signal strength, low-data rate, and unintelligent use of hardware and network resources in a wireless network (e.g. a cellular network). In an example, in coverage blackspot, a geographic area may experience either no signal or low signal strength due to various factors other than being too far from a base station. Examples of such factors include, but are not limited to environmental elements and/or conditions, such as terrain geography and non-terrain obstructions (such as buildings and trees, or signal fading objects used in building, such as metal, glass, and concrete) that obstruct signal or reduce signal strength. In telecommunications, a repeater device or system is used to extend the range of wireless radio frequency signals and/or improve the weak signals, if any, at a specific installation site, in a cellular network. Currently, repeater devices typically operate in silos, that is, the performance of a conventional repeater device is limited on its individual capability. Existing communication systems generally fail to adequately harness capability of other repeater devices or different technologies in convergent manner resulting in the unintelligent use of hardware and network resources in the wireless network (e.g. the cellular network), which is not desirable.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and method for managing a network of RF repeater devices, for example, for high-performance and efficient communication, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
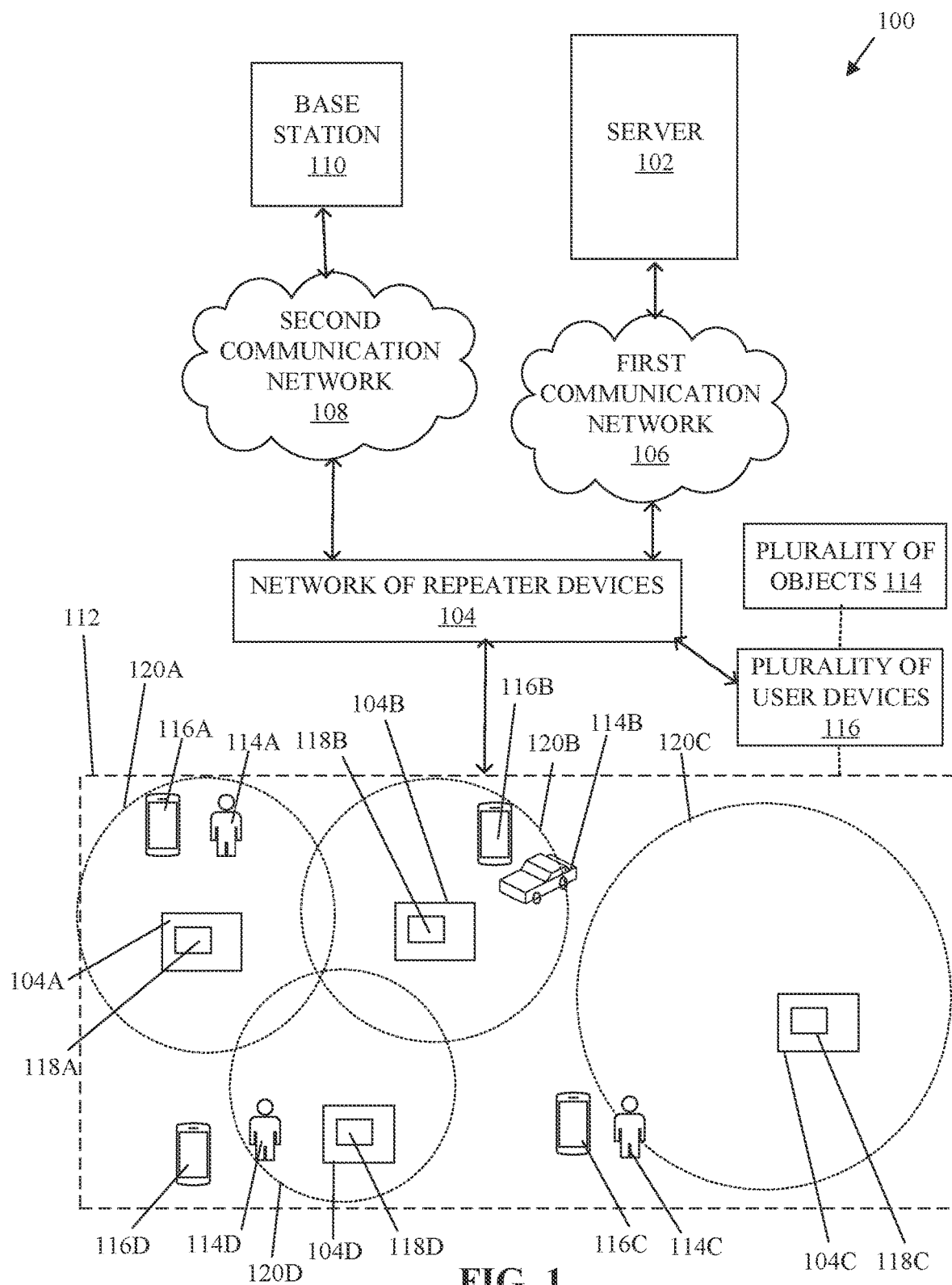
FIG. 1 is a network environment of a system to manage a network of RF repeater devices, in accordance with an exemplary embodiment of the disclosure.

Certain embodiments of the disclosure may be found in a system and method for managing a network of repeater devices, for example, for high-performance and efficient communication. The system and method of the present disclosure provides an always-connected experience and improves data rate at end-user devices that are communicatively coupled to one or more repeater devices of the network of repeater devices. The system of the present disclosure functions as a server-based intelligent network management system that is capable of out-of-band management and control of the network of repeater devices for improved network performance and efficient communication.

Typically, in conventional communication systems, various repeater devices typically operate in silos, that is, the performance of a conventional repeater device is limited on its individual capability. Existing communication systems generally fail to adequately harness the capability of other repeater devices or different technologies in a convergent manner resulting in the unintelligent use of hardware and network resources in the wireless network (e.g. the cellular network). For example, a conventional repeater device operating in silos, may not be adequately aware of its surrounding environment or any change in its surrounding environment. In other words, the physical environment in which signal is to be communicated is not completely known, resulting in unintelligent use of hardware and network resources in the wireless network. For example, hardware power management becomes inefficient, and radiation or beamforming pattern used for communication, is static or mostly pre-configured, where either more amount of power is used than required, or very low power than required. Moreover, the location of end-user devices may not be accurate, or the location may be dynamically changing, thereby increasing the inefficiency in the operation of such conventional repeater devices in terms of increased computational complexity, improper coverage of blind spot, failure to detect new blind spots, or new signal blockers, intermittent connectively issues, or data rate fluctuations.

In comparison with conventional systems, the system and method of the present disclosure ensures intelligent use of hardware and network resources in the wireless network (e.g. a cellular network) by out-of-band management and control of the network of repeater devices for improved network performance and efficient communication. Moreover, each repeater device of the network of repeater devices may be provided with a radio detection and ranging system, which may capture radar data of its local surrounding environment. Each repeater device of the network of repeater devices may also be provided with Light Detection and Ranging (LIDAR), which may capture radar data of its local surrounding environment. The disclosed system is capable of generating a three-dimensional representation of a geographical area based on obtained surrounding environment scan information from each repeater device of the network of repeater devices and a plurality of signal propagation indicators determined by the system using such obtained surrounding environment scan information. The three-dimensional representation refers to an accurate three-dimensional representation of the environment that indicates open areas, blocked areas (or signal blockers), presence of passive reflectors, or other repeater devices in the geographical area. Thus, the collective capability of network of repeater devices is adequately and synergistically harnessed to improve execution of operations at each repeater device of the network of repeater device, ensure intelligent use of hardware and network resources, and further improve communication reliability and quality-of-service (QoS). In the following description, reference is made to the accompanying drawings, which form a part hereof, and in which is shown, by way of illustration, various embodiments of the present disclosure.

FIG. 1 is a network environment of a system to manage a network of repeater devices, in accordance with an exemplary embodiment of the disclosure. With reference to FIG. 1, there is shown a network environment of a system 100. The system 100 may include a server 102 and a network of repeater devices 104 (namely, a first repeater device 104A, a second repeater device 104B, a third repeater device 104C, and a fourth repeater device 104D). There is further shown a first communication network 106, a second communication network 108, a base station 110, and a geographical area 112. There is further shown a plurality of objects 114 (namely, a first object 114A, a second object 114B, a third object 114B, and a fourth object 114D) and a plurality of user devices 116 (namely, a first user device 116A, a second user device 116B, a third user device 116C, and a fourth user device 116D) in the geographical area 112. Each repeater device of the network of repeater devices 104 may include a radio detection and ranging system (hereinafter, referred to as a radar, namely, a first radar 118A, a second radar 118B, a third radar 118C, and a fourth radar 118D).

The server 102 includes suitable logic, circuitry, and interfaces that may be configured to execute an out-of-band control of operations of the network of repeater devices 104. In an implementation, the server 102 may be a backplane system implemented as a cloud resource, such as a cloud server. Other implementation examples of the server 102 may include, but are not limited to, an application server, a web server, a database server, a mainframe server, or a combination thereof. Further, it should be appreciated that the server 102 may be a server arrangement implemented as a single hardware server or a plurality of hardware servers operating in a parallel or distributed architecture.

The server 102 may include control circuitry 102A. The control circuitry 102A comprises suitable logic, circuitry, and interfaces configured to control the network of repeater devices 104. The control circuitry 102A is configured to obtain and process surrounding environment scan information from each repeater device of the network of repeater devices 104. The surrounding environment scan information may include radar data captured by the radar 118 provided in each repeater device of the network of repeater devices 104. Examples of the control circuitry 102A include, but is not limited to, an Application-Specific Integrated Circuit (ASIC) processor, a Complex Instruction Set Computing (CISC) processor, a central processing unit (CPU), a combination of the CPU and a graphics processing unit (GPU), a microcontroller, and/or other hardware processors, or circuitry.

Each of the network of repeater devices 104 (namely, the first repeater device 104A, the second repeater device 104B, the third repeater device 104C, and the fourth repeater device 104D) includes suitable logic, circuitry, and interfaces that may be configured to communicate with the server 102, one or more other repeater devices of the network of repeater devices 104, one or more passive signal reflectors, and the plurality of user devices 116. Examples of the each of the network of repeater devices 104 may include, but is not limited to, a cellular repeater device (e.g. NR-enabled or 5G enabled), a 5G wireless access point, a multiprotocol wireless range extender device, an evolved-universal terrestrial radio access-new radio (NR) dual connectivity (EN-DC) device, a NR-enabled repeater device, a wireless local area network (WLAN)-enabled device.

The first communication network 106 refers to an out-of-band communication network, which employs a frequency band (e.g. an unlicensed frequency band) that is outside a defined telecommunications frequency band (e.g. licensed frequency band). The first communication network 106 may include an out-of-band medium through which the server 102 communicates with the network of repeater devices 104, and vice-versa. In some embodiments, a secured and dedicated communication channel may be established between the server 102 and the network of repeater devices 104. Examples of the first communication network 106 include, but are not limited to, the Internet (e.g. Transmission Control Protocol and Internet Protocol (TCP/IP), a Wireless-Fidelity (Wi-Fi) network (e.g. IEEE 802.11, IEEE 802.11ah, also known as Wi-Fi "HaLow" or other variation of Wi-Fi), a light fidelity (Li-Fi) network, an infrared communication network, a radio frequency for consumer electronics (RF4CE) network, a wireless sensor network, an Internet-of-Things network, User Datagram Protocol (UDP), Hyper-text Transfer Protocol (HTTP), File Transfer Protocol (FTP), a wired network, or other out-of-band wireless network.

The second communication network 108 refers to an in-band communication network, which employs a defined telecommunications frequency band (e.g. licensed frequency band), for example, a cellular network (2G, 3G, 4G, 5G, 5G NR, or any other cellular communication protocols).

The base station 110 may be a fixed point of communication that may provide information, in form of one or more beams of RF signals, to and from communication devices, such as one or more repeater devices of the network of repeater devices 104 and one or more user devices of the plurality of user devices 116. Multiple base stations corresponding to one or more service providers, may be geographically positioned to cover specific geographical areas. Typically, bandwidth requirements serve as a guideline for a location of the base station 110 based on relative distance between one or more user devices of the plurality of user devices 116 and the base station 104. The count of base stations may be dependent on, for example, population density and geographic irregularities, such as buildings and mountain ranges, which may interfere with one or more beams of RF signals. For the sake of brevity, in FIG. 1, one base station, such as the base station 110, is shown. However, generally, there may be different base stations that may communicate with different repeater devices in the network of repeater devices 104.

The geographical area 112 refers to a physical area within which the network of repeater devices 104 are deployed and are operative to provide radio frequency signals to one or more user devices communicatively coupled to corresponding repeater devices in their corresponding radius, such as areas 120A, 120B, 120C, and 120D. Alternatively stated, the geographical area 112 may be a collective scanned area scanned by radars, such as the first radar 118A, the second radar 118B, the third radar 118C, and the fourth radar 118D of the network of repeater devices 104. Moreover, the geographical area 112 further indicates a collective coverage area of the network of repeater devices 104.

The plurality of objects 114 may be include one or more of a person (a user), a vehicle, or a drone. For example, the first object 114A may be a first user who may carry the first user device 116A. Similarly, the second object 114B may be a vehicle, such as a car, in which the second user device 116B or the first user device 116A is carried. The third object 114C and the fourth object 114D may be users who may carry the third user device 116C and the fourth user device 116D, respectively.

Each of the plurality of user devices 116 (namely, the first user device 116A, the second user device 116B, the third user device 116C, and the fourth user device 116D) refers to a telecommunication hardware, for example, a user equipment, used by an end-user to communicate. Alternatively stated, each of the plurality of user devices 116 may refer a combination of mobile equipment and subscriber identity module (SIM). Other examples of the plurality of user devices 116 may include, but are not limited to a smartphone, a mobile communication equipment, a customer premise equipment, or any other customized hardware for telecommunication.

Each repeater device of the network of repeater devices 104 may include a radio detection and ranging system (hereinafter, referred to as a radar), such as the first radar 118A, the second radar 118B, the third radar 118C, and the fourth radar 118D. Each radar, such as the first radar 118A, the second radar 118B, the third radar 118C, and the fourth radar 118D is configured to capture radar data of its surrounding environment, such as the areas 120A, 120B, 120C, and 120D. The radar data may be three-dimensional scan data (e.g. point cloud data, laser scanning, three-dimensional imagery) of real-world environment and its objects. The radar may use radio waves to determine a range, angle, or velocity of an object, such as the plurality of objects 114.

In operation, the control circuitry 102A of the server 102 may be configured to obtain surrounding environment scan information from each repeater device of the network of repeater devices 104. The surrounding environment scan information may be obtained via the first communication network 106 (i.e. out-of-band communication). The surrounding environment scan information comprises radar data captured by each radar (such as the first radar 118A, the second radar 118B, the third radar 118C, and the fourth radar 118D) provided in each repeater device of the network of repeater devices 104. For example, the first radar 118A may capture radar data of its surrounding environment (e.g. the area 120A). In an example, the radar data may be a three-dimensional point cloud data that captures infrastructure, such as terrain, natural objects, and man-made objects (e.g. buildings, monuments). In some embodiments, each radar, such as such as the first radar 118A, the second radar 118B, the third radar 118C, and the fourth radar 118D, may be further configured to scan the surrounding environment to detect open areas, signal blockers, passive reflectors, and the like, which may have influence on the way a signal propagates. In some embodiments, such detection is executed at the server 102.

In accordance with an embodiment, each radar, such as such as the first radar 118A, the second radar 118B, the third radar 118C, and the fourth radar 118D, may be further configured to detect one or more objects of the plurality of objects 114. Each radar may also track a movement of the one or more objects of the plurality of objects 114. Beneficially, each of the network of repeater devices 104 further exploits the radar to detect a distance of each object from the corresponding repeater device and track movement of the one or more objects in addition to standard cellular network resources (e.g. control plane based signaling) based location estimation, thereby improving location estimation and movement tracking accuracy within the geographical area 112.

The control circuitry 102A may be further configured to determine a plurality of signal propagation indicators based on the obtained surrounding environment scan information from each repeater device of the network of repeater devices 104. The plurality of signal propagation indicators may include one or more open areas and one or more blocked areas surrounding each repeater device of the network of repeater devices 104. The plurality of signal propagation indicators indicate areas and directions whether there is a no signal propagation issues (e.g. areas or directions where signal fading or strength reduction is less likely to occur), areas or objects, like trees, buildings, or other signal obstruction objects present act as signal blockers, which increases a likelihood of signal obstruction or increased fading in certain directions. In accordance with an embodiment, the control circuitry 102A may be further configured to detect one or more passive reflectors present in the geographical area 112 for the determination of the plurality of signal propagation indicators. The one or more passive reflectors present in the geographical area 112 may be detected based on the obtained surrounding environment scan information from each repeater device of the network of repeater devices 104. Thus, the plurality of signal propagation indicators may further include the detected one or more passive reflectors. The detected one or more passive reflectors may be configured to reflect signals in a non-line-of-sight path such that one or more signals reaches one or more reflectors and/or end users, such as the one or more user devices of the plurality of user devices 116.

The control circuitry 102A may be further configured to generate a three-dimensional representation of the geographical area 112 based on the obtained surrounding environment scan information from each repeater device of the network of repeater devices 104 and the determined plurality of signal propagation indicators. The three-dimensional representation of the geographical area 112 may be a more accurate three-dimensional scan of the environment, such as the geographical area 112. The control circuitry 102A may be configured to merge the obtained surrounding environment scan information obtained for each repeater device of the network of repeater devices 104 to generate the three-dimensional representation. Moreover, the determined plurality of signal propagation indicators may be marked in the three-dimensional representation that may provide a holistic view of the environment so that signal transmission and reception to and from each of the network of repeater devices 104 may be improved accordingly. In some embodiments, the control circuitry 102A may be further configured to determine a plurality of signal propagation strategies to mitigate in advance a number of different scenarios. For example, in a first scenario, a user carrying a user device may move in circular laps around a building. In such a scenario, multiple passive reflectors may be used by a same repeater device, such as the first repeater device 104A, and received signal strength at the user device may be measured. In another scenarios, two or more repeaters of the network of repeaters 104 may be used as the user moves to provide signal coverage with improved signal strength, and received signal strength at the user device may be measured. Thus, it may be learned and known which strategy works for a particular building (or area), and for what type of movement(s). Thus, the learnings may be employed to improve signal coverage and signal strength handling capability when similar situations are encountered. In this regard, active and/or passive repeaters along a path may be configured with corresponding parameters based on the learnings to provide optimal communication (e.g. improved signal strength, gain, beamforming) along the path.

The control circuitry 102A may be further configured to track a location and movement of the plurality of user devices 116 in the geographical area 112. In an implementation, the location and movement of the plurality of user devices 116 in the geographical area 112 may be tracked based on sensor data, for example, satellite-based navigation system, obtained from the plurality of user devices 116. In an example, a network service provider usually provides a software application or suitable code executed by circuitry to manage subscriber accounts. In some cases, based on user-preferences, and permissions, location data can be obtained from each of the plurality of user devices 116 using the software application. In cases where one or more user devices are customer premise equipment, the location is fixed and known. The movement may be usually tracked for movable devices, such as smartphones, or other customized telecommunication hardware used for communication. Thus, in addition to location tracking using network resources (e.g. control plane signaling etc.) of cellular network (e.g. the second communication network 108), the location and movement data can be correlated, and accuracy may be increased. Additionally, the location and movement of the plurality of user devices 116 in the geographical area 112 may be tracked based on tracking information acquired from the radar provided in each of the network of repeater devices 104. The tracking information, for example, location coordinates, of an object may be same as of the user device carried by the object (e.g. a person). In such as case, all such data combined provides a significantly accurate location and movement tracking of the plurality of user devices 116 in a power efficient manner (as large amount power typically used in cellular network-based tracking is saved).

The control circuitry 102A may be further configured to select a beamforming scheme from a plurality of beamforming schemes for one or more repeater devices of the network of repeater devices 104 based on the generated three-dimensional representation of the geographical area 112 and the tracked location and movement of the plurality of user devices 116. Examples of the plurality of beamforming schemes include, but are not limited to, a narrow beam (such as a pencil beam), a wide beam (a divergent beam), a plurality of split beams, unidirectional beams, multi-directional beams, omni-directional beams, adaptive sidelobe interference cancelling beams, or a combination thereof. Moreover, the amount power (i.e. radiation) to be used, the direction in which beaming needs to be performed, and the like, may be part of the beamforming scheme. The selection of beamforming scheme is based on a balanced approach, where an optimum use of hardware resources, is maintained. For example, a less amount of power than average (or usual practice) is used when the accurate location of a given user device is known. Thus, a narrow beamforming scheme may be selected that is enough to provide signals to one user device and when data communication is not in use, and may increase power when data communication is performed at the user device. Moreover, the beaming angle or power may change (i.e. continuously updated) to follow wherever the given user device moves and for signal strength to be almost consistent at the given user device.

The control circuitry 102A may be further configured to execute an out-of-band control of operations of the network of repeater devices 104 based on the generated three-dimensional representation, the selected beamforming scheme for the one or more repeater devices, and the tracked location and movement of the plurality of user devices 116 in the geographical area 112. Advantageously, the use of the accurate generated three-dimensional representation, the improved selection of beamforming scheme for the one or more repeater devices, and the accurately tracked location and movement of the plurality of user devices 116 in the geographical area 112, ensures intelligent use of hardware and network resources in a cellular network (the second communication network 108)) by out-of-band management and control of the network of repeater devices (using the first communication network 106) for improved network performance and efficient communication. The three-dimensional representation refers to an accurate three-dimensional representation of the environment that indicates open areas, blocked areas (or signal blockers), presence of passive reflectors, or other repeater devices in the geographical area 112. Thus, the collective capability of network of repeater devices 104 is adequately and synergistically harnessed to improve execution of operations at each repeater device of the network of repeater device 104, ensure intelligent use of hardware and network resources, and further improve communication reliability and quality-of-service (QoS).

In accordance with an embodiment, the control circuitry 102A may be further configured to acquire tracking information of movement of the plurality of objects in the geographical area 112 from one or more repeater devices of the network of repeater devices 104. Each radar, such as the first radar 118A, the second radar 118B, the third radar 118C, and the fourth radar 118D, provided in each repeater device of the network of repeater devices 104 may be further configured to track movement of one or more objects of the plurality of objects 116. In such an embodiment, the control circuitry 102A may be further configured to tag each user device of the plurality of user devices 116 to a corresponding object of the plurality of objects 114 based on a substantially same location and movement coordinates tracked for each user device of the plurality of user devices 116 and the corresponding object. In an example, the first object 114A may be a person who may be tracked by the first radar 118A, and the tracking information may be provided to the server 102. In a case where, the location and movement coordinates tracked for the first user device 116A and the first object 114A is a substantially same, it indicates the first user device 116A belongs to the first object 114A who may be carrying the first user device 116A. Thus, an association is established based on almost same location and movement coordinates, and the first user device 116A may be tagged with the first object 114A. The substantially same location and movement coordinates may refer to almost same, for example, 90-100% same (or a deviation is less than defined "X" cm, for example, 1-150 cm). Additionally, by use of radar, lidar, object features, for example, face pattern, eyes features, and body structure can be identified in case the object is a person. In a case where the object is a vehicle, it may also be identified.

In accordance with an embodiment, in order to execute the out-of-band control of operations of the network of repeater devices 104, the control circuitry 102A is further configured to instruct the first repeater device 104A in the network of repeater devices 104 to provide a beam of a radio frequency signal to the first object 114A in motion of the plurality of objects 114. In an implementation, the first repeater device 104A may be instructed to provide the beam of the radio frequency signal to the first object 114A based on the location and movement of the plurality of user devices 116 tracked in the geographical area 112. In another implementation, the first repeater device 104A may be instructed to provide the beam of the radio frequency signal to the first object 114A further based on the tagging and the acquired tracking information of the movement of the plurality of objects 114 in the geographical area 112. Thus, as the first object 114A moves, the beam also moves in synchronization such that the first user device 116A carried by the first object 114A have an always connected experience while the beamforming related operations consumes less power in the first repeater device 104A as compared to a conventional repeater device. Moreover, as the accurate three-dimensional representation of the environment that indicates open areas, blocked areas (or signal blockers), presence of passive reflectors, is available, the signal provisioning (i.e. provisioning of the beam of the radio frequency signal) to the first user device 116A carried by the first object 114A may be efficiently made. Moreover, in such an embodiment, the selection of the beamforming scheme for the first repeater device 104A to provide the beam of the radio frequency signal is further based on the tagging and the acquired tracking information of the movement of the plurality of objects 114 in the geographical area 112. Thus, the selection of a correct and the most suited beamforming scheme for a particular area, a particular direction, a particular motion path, may be selected. This further ensures intelligent and efficient use of hardware and network resources, and further improve communication reliability and quality-of-service (QoS).

In accordance with an embodiment, in order to execute the out-of-band control of operations of the network of repeater devices 104, the control circuitry 102A may be further configured to select two or more repeaters in the network of repeaters 104 to concurrently provide beams of radio frequency signals to the second object 114B in motion of the plurality of objects 114. In an exemplary implementation, the two or more repeaters are selected to concurrently provide beams of radio frequency signals to the second object 114B in motion based on the location and movement of the plurality of user devices 116 tracked in the geographical area 112. In another exemplary implementation, the two or more repeaters are selected to concurrently provide beams of radio frequency signals to the second object 114B in motion based on the tagging and the acquired tracking information of the movement of the plurality of objects 114 in the geographical area 112. Moreover, in order to execute the out-of-band control of operations of the network of repeater devices 104, the control circuitry 102A may be further configured to instruct the selected two or more repeaters to concurrently provide the beams of radio frequency signals to the second object 114B in motion based on the tagging and the acquired tracking information of the movement of the plurality of objects in the geographical area 112. A concurrent provisioning of the beams of radio frequency signals to the second object in motion causes an increase in data rate of a user device, such as the second user device 116B, carried by the second object 114B. For example, the data rate may be doubled or tripled (i.e. significantly increased, for example "X" gigabit data rate increases to "2X" data rate). Thus, the collective capability of network of repeater devices 104 is adequately and synergistically harnessed to improve execution of operations at each repeater device of the network of repeater device 104.

In accordance with an embodiment, in order to execute the out-of-band control of operations of the network of repeater devices 104, the control circuitry 102A may be further configured to estimate an amount of power to be used to communicate a beam of a radio frequency signal to the first user device 116A of the plurality of user devices 116 based on the generated three-dimensional representation of the geographical area 112. In other words, the radar provided in each repeater device of the network of repeater devices 104 may be used to determine how much power should be used to communicate with a particular user, such as the first user device 116A carried by the first object 114A. This further ensures intelligent power control and efficient use of hardware and network resources. In an implementation, the control circuitry 102A may be further configured to estimate the amount of power to be used to communicate the beam of radio frequency signal to the first user device of the plurality of user devices 116, based on the generated three-dimensional representation of the geographical area as well as the tracked location and movement of the first user device 116A of the plurality of user devices 116 in the geographical area 112. Moreover, the control circuitry 102A may be further configured to execute an out-of-band control of operations of the first repeater device 104A of the network of repeater devices 104 such that the beam of radio frequency signal communicated to the first user device 116A from the first repeater device 104A uses the estimated amount of power. In an example, the use of accurate three-dimensional representation of the environment that indicates open areas, blocked areas (or signal blockers), presence of passive reflectors, enables to estimate how much power will be needed to penetrate a building material, such as a tinted glass structure.

In accordance with an embodiment, in order to execute the out-of-band control of operations of the network of repeater devices 104, the control circuitry 102A may be further configured to acquire an image of a first user (such as the first object 114A) from an image-capture device provided in at least one repeater device in the network of repeater devices 104. Alternatively, the image-capture device may be separately installed (e.g. in some cases, dedicated or shared CCTVs deployed within the geographical area 112) may be used to acquire the image of ore or more objects of the plurality of objects 114. The control circuitry 102A may be further configured to identify the first user based on the acquired image. For example, the first object 114A may be identified as person A, the second object 114B may be identified as vehicle owned by the second object 114B. In some cases, vehicle identification number (or attached radio frequency identifier) may also be used to identify ownership. The control circuitry 102A may be further configured to assign a unique identity of the first user to the first user device 116A and the first object 114A that are tagged with each other. Thus, different user devices and objects are identified within the geographical area 112 and may be tagged with each other to indicate their association with a common identity. As each of the plurality of user devices 116 are tagged with a corresponding object of the plurality of objects 114, and identity of user operating such user devices is known, a personalized telecommunication service may be provisioned to each user.

In accordance with an embodiment, in order to execute the out-of-band control of operations of the network of repeater devices 104, the control circuitry 102A may be further configured to provide a personalized telecommunication service to the first user (e.g. the first user device 116A carried and owned by the first object 114A) based on the assigned unique identity. In an example, the network of repeater devices 104 may be employed for user authentication based on the assigned unique identity e.g. for a point-of-sale (POS) transaction, which may increase security of POS systems.

In another example, a particular user may be provided a high-data rate Wi-Fi connection when the user is in the vicinity of a repeater device of the network of repeater device 104. Thus, almost all areas of the geographical area 112 may be covered by the coverage of the network of repeater devices 104. Even if the user carrying the first user device 116A is moving within the geographical area 112, Wi-Fi connection may be seamlessly maintained while different repeater device of the network of repeater device 104 becomes temporary wireless access points providing out-of-band data connectivity. Such data connectivity may be provided when it is detected that data rate of the second communication network 108 at a given time period is below a threshold (e.g. during fluctuations or low download or upload speed due to network load). Thus, in such scenarios, the data connection (Internet connectively) may be automatically established from a nearest repeater device (nearest or closest proximity to the user device) of the network of repeater devices 104, where if the user device moves, the high-data rate connection is re-established with another repeater device. Moreover, in cases where the data rate of the cellular network (e.g. the second communication network 108) is consistent for a defined time period, the data connection may be dynamically switched back to the subscribed cellular network based on a user-preference. Similarly, many other dedicated services may be provided by the network of repeater devices 104, for example, gaming, virtual reality, and other high-volume media streaming applications (e.g. 4K or 8K videos). Thus, a high-performance, near zero latency, and noise-free high-volume content (e.g. data, audio, and video including 4K or 8K video) communication is achieved with an always connected experience and significantly improved data rates as compared to conventional systems.

In some embodiments, in order to execute the out-of-band control of operations of the network of repeater devices 104, the control circuitry 102A may be further configured to track one or more robots (i.e. mobile robotic systems or devices) and provide better communication to the robot. For example, a large number of robots used in a warehouse may be controlled using the network of repeater devices 104 with zero-latency in communication.

Figure 2A:
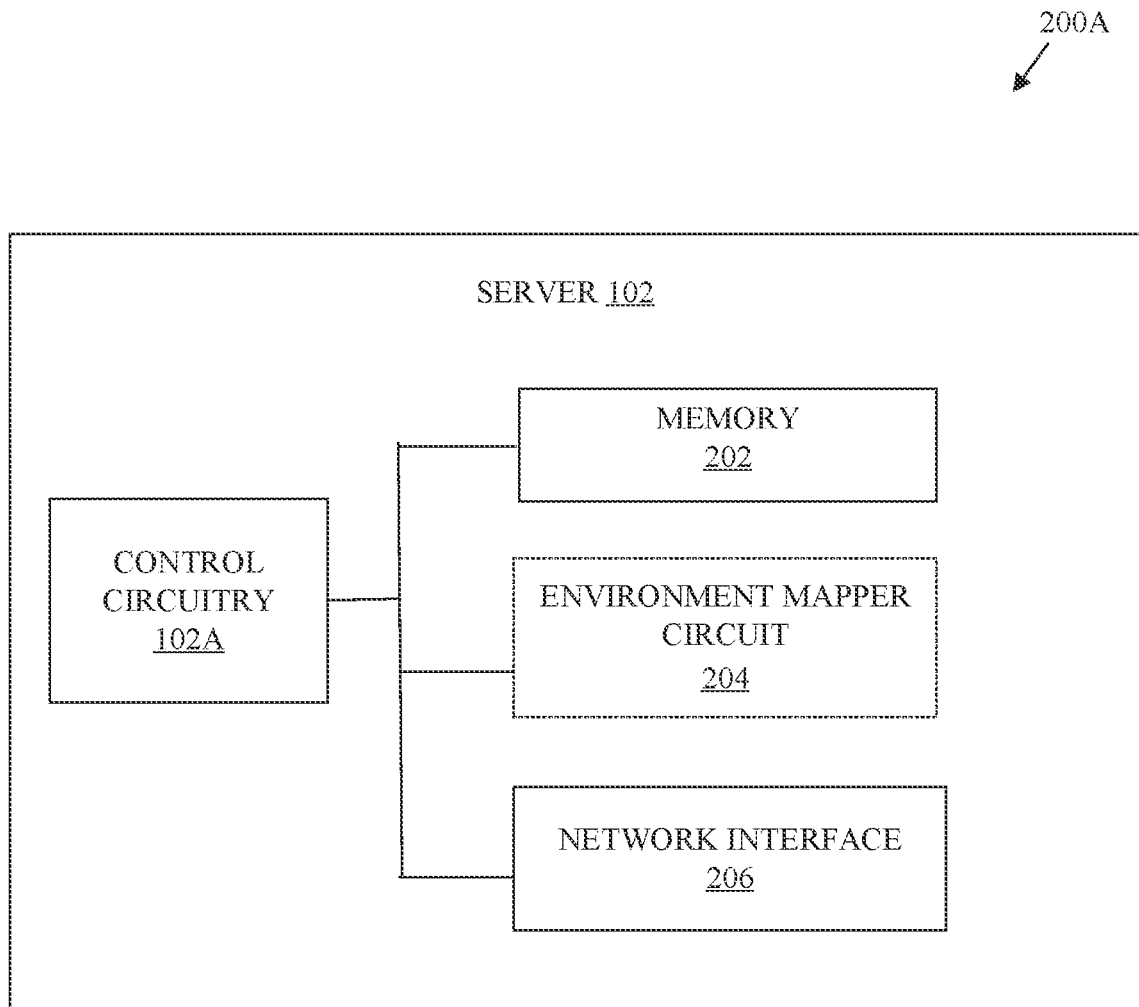
FIG. 2A is a block diagram that illustrates various components of an exemplary server, in accordance with an exemplary embodiment of the disclosure.

FIG. 2A is a block diagram that illustrates various components of an exemplary server, in accordance with an exemplary embodiment of the disclosure. FIG. 2A is explained in conjunction with elements from FIG. 1. With reference to FIG. 2A, there is shown a block diagram 200A of the server 102. The serve 102 may include the control circuitry 102A, a memory 202, and an environment mapper circuit 204, and a network interface 206. The control circuitry 102A may be communicatively coupled to the memory 202, the environment mapper circuit 204, and the network interface 206.

The memory 202 may include suitable logic, circuitry, and/or interfaces that may be configured to store instructions executable by the control circuitry 102A. The memory 202 may be configured to store surrounding environment scan information obtained from each repeater device of the network of repeater devices 104. The memory 202 may be further configured to store the three-dimensional representation of the geographical area 112 generated based on the obtained surrounding environment scan information from each repeater device of the network of repeater devices 104 and the determined plurality of signal propagation indicators. The memory 202 may be configured to store temporary processing data, such as an ongoing tracking of a location and movement of the plurality of user devices 116 and the plurality of objects 114 in the geographical area 112. Examples of implementation of the memory 202 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The environment mapper circuit 204 comprise suitable logic and interfaces that may be configured to generate the three-dimensional representation of the geographical area 112. The three-dimensional representation may be more accurate three-dimensional environment scan as compared to conventional method and systems g generating environment scan data. The three-dimensional representation may be generated based on the obtained surrounding environment scan information from each repeater device of the network of repeater devices 104 and the determined plurality of signal propagation indicators. In an implementation, the environment mapper circuit 204 may be specialized circuitry, that is a combination of the GPU and the CPU. In another implementation, the environment mapper circuit 204 may be integrated with the control circuitry 102A as an integrated circuit, or the ASIC.

The network interface 206 may comprise suitable logic, circuitry, interfaces, and/or code that may be configured to connect and communicate with the network of repeater devices 104. The network interface 206 may implement known technologies to support out-of-band wireless communication. The network interface 206 may include, but are not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 206 may communicate via offline and online wireless communication with networks, such as the Internet, an Intranet, and/or other out-of-band wireless network, such as the first communication network 106.

Figure 2B:
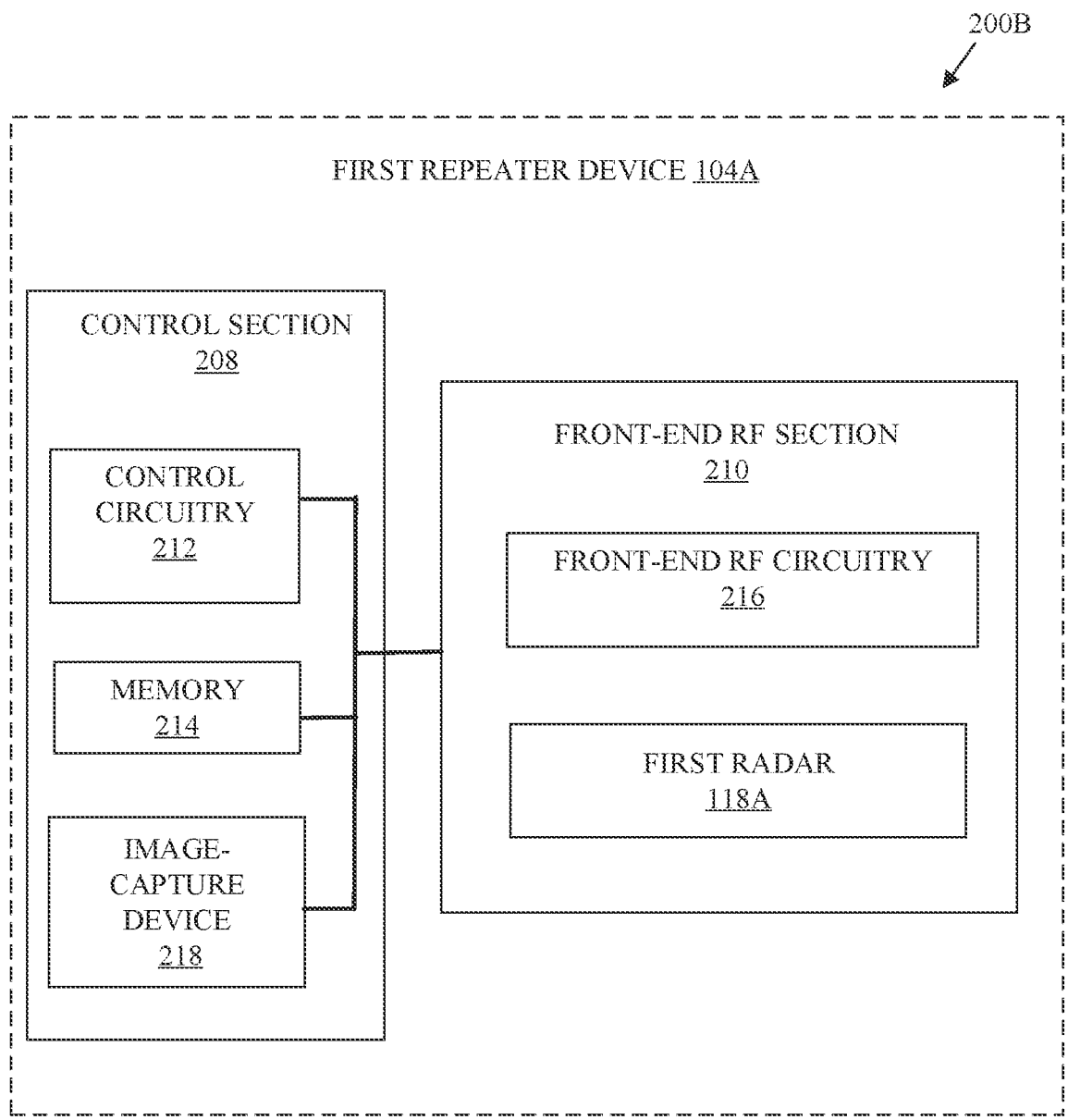
FIG. 2B is a block diagram that illustrates various components of an exemplary repeater device, in accordance with an exemplary embodiment of the disclosure.

FIG. 2B is a block diagram illustrating various components of an exemplary repeater device of a network of repeater devices, in accordance with an exemplary embodiment of the disclosure. FIG. 2B is explained in conjunction with elements from FIG. 1 and FIG. 2A. With reference to FIG. 2B, there is shown a block diagram 200B of the first repeater device 104A. The first repeater device 104A may include a control section 208 and a front-end radio frequency section 210. The control section 208 may include control circuitry 212 and a memory 214. The control section 208 may be communicatively coupled to the front-end radio frequency section 210. The front-end radio frequency section 210 may include front-end radio frequency circuitry 216 and the first radar 118A. In an implementation, the control section 208 may further include an image-capture device 218.

The control circuitry 212 may be configured to receive instructions (e.g. control instructions) from the server 102 via the first communication network 106 (e.g. out-of-band communication). The control circuitry 212 may be configured to execute beamforming based on the selected beamforming scheme obtained from the server 102. The control circuitry 212 may be further configured to execute certain operations in the first repeater device 104A based on instructions received from the server 102 (e.g. a cloud-based server). Examples of implementation of the control circuitry 212 may be similar to that of the control circuitry 102A (FIG. 1).

The memory 214 may be configured store beamforming schemes and values for execution of various operations in the first repeater device 104A. The memory 214 may be further configured to store radar data captured by the first radar 118A. Examples of the implementation of the memory 214 may be same as that of the memory 202.

The front-end radio frequency circuitry 216 may support multiple-input multiple-output (MIMO) operations, and may be configured to execute MIMO communication with a plurality of end-user devices, such as the plurality of user devices 116. The front-end radio frequency circuitry 216 may be configured to perform beamforming based on the selected beamforming scheme, for example, narrow beam, wide beam, multiple narrow beams in multiple directions, or a single directive beam. The front-end radio frequency circuitry 216 may include a transmitter circuitry and a receiver circuitry, in an example. In an implementation, the transmitter circuitry may be configured to transmit one or more beams of mmWave radio frequency signal to one or more user devices of the plurality of user devices 116 under the control of the control circuitry 102A.

In another implementation, the transmitter circuitry may be configured to transmit one or more beams of mmWave radio frequency signal to one or more another repeater devices, such as the second repeater device 104B, the third repeater device 104C, in a chain transmission, over a wired or wireless medium, to finally provide such signal to the one or more user devices of the plurality of user devices 116. In this case, the MIMO communication between the last repeater device, such as the third repeater device 104C, and the one or more user devices, may be executed at a sub 6 gigahertz (GHz) frequency that is less than the specified frequency of the one or more beams of mmWave radio frequency signal used for communication among the repeater devices, such as from the first repeater device 104A to the second repeater device 104B and further to the third repeater device 104C. In an example, the mmWave radio frequency signal is received at specified frequency (e.g. 30 to 300 GHz), whereas the MIMO communication is executed at a different frequency, such as sub 6 gigahertz, with the plurality of user devices 116. This mode of operation is beneficial and advantageous, given that the propagation at lower frequency (sub 6 GHz) results in rich scattering channel response, which leads to better MIMO capacity and MIMO performance. Alternatively, in yet another implementation, the communication among the network of repeater devices 104 and final provisioning to the plurality of user devices 116 is in the one or more beams of mmWave radio frequency signal.

The image-capture device 218 may be configured to capture an image of one or more users. In an implementation, the image-capture device 218 may be separately installed (e.g. in some cases, dedicated or shared CCTVs deployed within the geographical area 112). Examples of the image-capture device 218 may include, but is not limited to a video camera, an image sensor, a combination of infrared and image sensor, a time-of-flight (TOF) camera, and a closed-circuit television (CCTV).

Figure 3A:
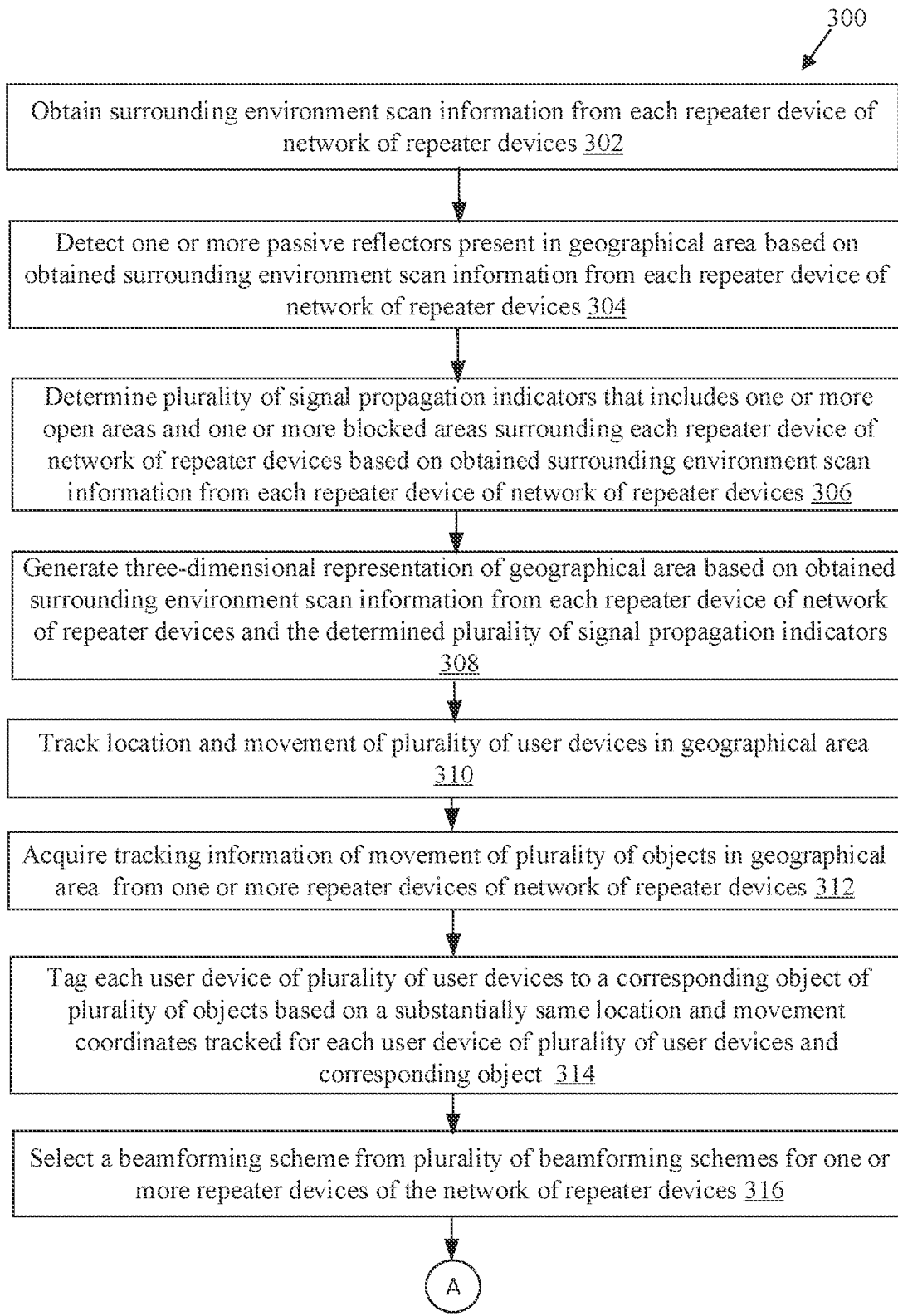
FIG. 3A and FIG. 3B collectively, is a flowchart that illustrates an exemplary method for managing a network of RF repeater devices for high network performance, in accordance with an embodiment of the disclosure.
Figure 3B:
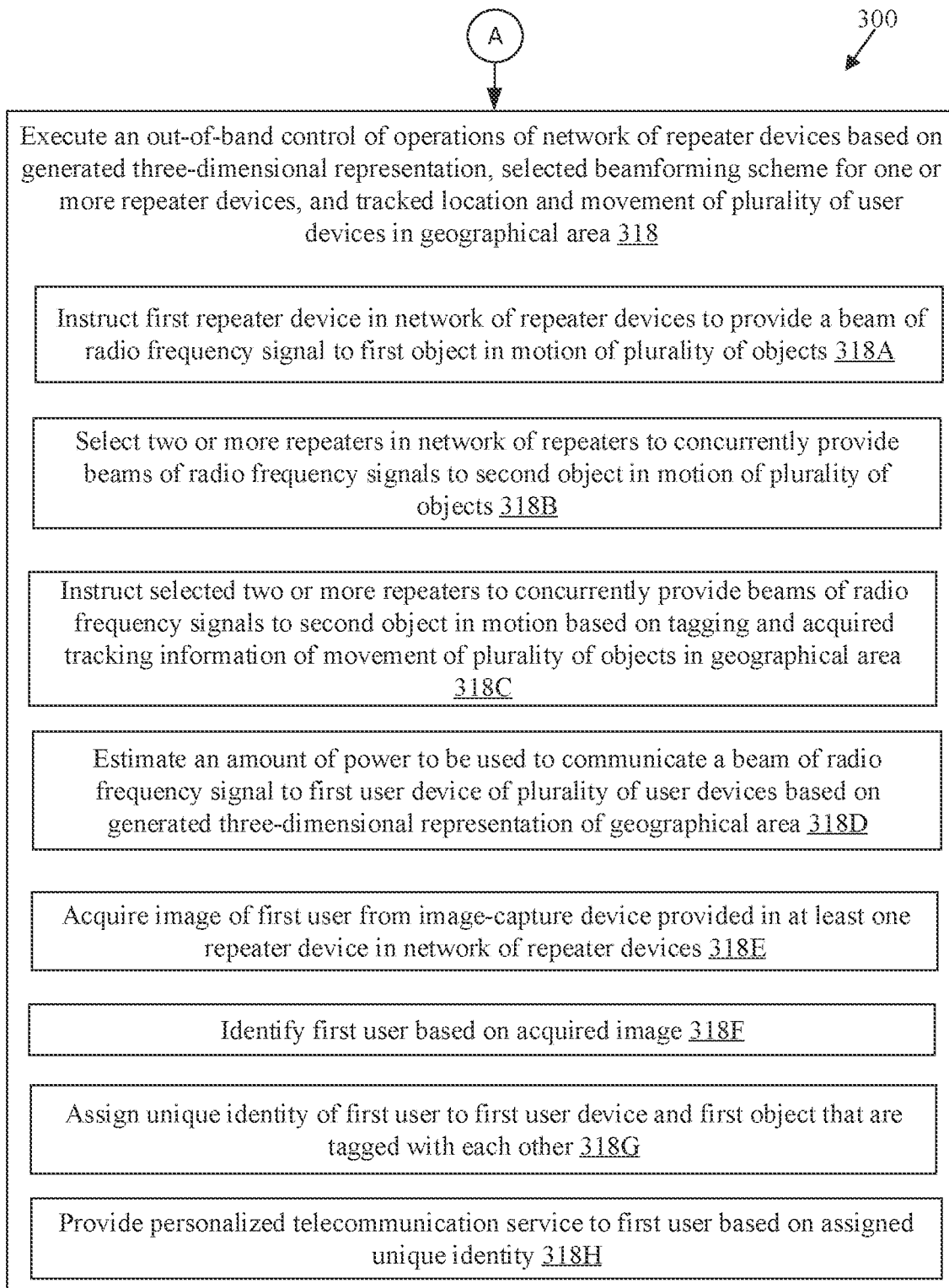

FIG. 3A and FIG. 3B collectively, is a flowchart that illustrates an exemplary method for managing a network of repeater devices for high network performance, in accordance with an embodiment of the disclosure. FIGS. 3A and 3B are explained in conjunction with elements from FIGS. 1, 2A, and 2B. With reference to FIGS. 3A and 3B, there is shown a flowchart 300 comprising exemplary operations 302 through 318 (including 318A to 318H).

At 302, surrounding environment scan information may be obtained from each repeater device of the network of repeater devices 104. The surrounding environment scan information may include radar data captured by the radar, such as the first radar 118A, the second radar 118B, the third radar 118C, and the fourth radar 118D, provided in each repeater device of the network of repeater devices 104.

At 304, one or more passive reflectors present in the geographical area 112 may be detected based on the obtained surrounding environment scan information from each repeater device of the network of repeater devices 104.

At 306, a plurality of signal propagation indicators that includes one or more open areas and one or more blocked areas surrounding each repeater device of the network of repeater devices 104, may be determined based on the obtained surrounding environment scan information from each repeater device of the network of repeater devices 104. The plurality of signal propagation indicators may further include the detected one or more passive reflectors.

At 308, a three-dimensional representation of the geographical area 112 may be generated based on the obtained surrounding environment scan information from each repeater device of the network of repeater devices 104 and the determined plurality of signal propagation indicators.

At 310, a location and movement of a plurality of user devices 116 may be tracked in the geographical area 112.

At 312, tracking information of movement of the plurality of objects 114 may be acquired in the geographical area 112 from one or more repeater devices of the network of repeater devices 104. The radar provided in each repeater device of the network of repeater devices 114 may be configured to track movement of one or more objects of the plurality of objects 114.

At 314, each user device of the plurality of user devices 116 may be tagged to a corresponding object of the plurality of objects 114 based on a substantially same location and movement coordinates tracked for each user device of the plurality of user devices 116 and the corresponding object.

At 316, a beamforming scheme from a plurality of beamforming schemes may be selected for one or more repeater devices of the network of repeater devices 104 based on the generated three-dimensional representation of the geographical area 112 and the tracked location and movement of the plurality of user devices 116.

At 318, an out-of-band control of operations of the network of repeater devices 112 may be executed based on the generated three-dimensional representation, the selected beamforming scheme for the one or more repeater devices, and the tracked location and movement of the plurality of user devices 116 in the geographical area 112. The executing of the out-of-band control of operations of the network of repeater devices 104 may further include various operations, such as operations 318A to 318H.

At 318A, the first repeater device 104A in the network of repeater devices 104 may be instructed to provide a beam of a radio frequency signal to the first object 114A in motion of the plurality of objects 114. In an implementation, the first repeater device 104A may be instructed based on the location and movement of the plurality of user devices 116 tracked in the geographical area 112. Additionally, in another implementation, the first repeater device 104A may be instructed further based on the tagging and the acquired tracking information of the movement of the plurality of objects 114 in the geographical area 112. The selection of the beamforming scheme for the first repeater device 104A to provide the beam of the radio frequency signal may be further based on the tagging and the acquired tracking information of the movement of the plurality of objects 114 in the geographical area 112.

At 318B, two or more repeaters in the network of repeaters 104 may be selected to concurrently provide beams of radio frequency signals to the second object 114B in motion of the plurality of objects 114. In an implementation, the two or more repeaters are selected to concurrently provide beams of radio frequency signals to the second object 114B in motion based on the location and movement of the plurality of user devices 116 tracked in the geographical area 112. In another implementation, the two or more repeaters are selected to concurrently provide beams of radio frequency signals to the second object 114B in motion based on the tagging and the acquired tracking information of the movement of the plurality of objects 114 in the geographical area 112.

At 318C, the selected two or more repeaters may be instructed to concurrently provide the beams of radio frequency signals to the second object 114B in motion based on the tagging and the acquired tracking information of the movement of the plurality of objects in the geographical area 112. A concurrent provisioning of the beams of radio frequency signals to the second object in motion causes an increase in data rate of a user device, such as the second user device 116B, carried by the second object 114B.

At 318D, an amount of power to be used to communicate a beam of a radio frequency signal to the first user device 116A of the plurality of user devices 116 may be estimated based on the generated three-dimensional representation of the geographical area 112. The amount of power may be estimated based on the generated three-dimensional representation of the geographical area as well as the tracked location and movement of the first user device 116A of the plurality of user devices 116 in the geographical area 112. In an implementation, the out-of-band control of operations of the first repeater device 104A of the network of repeater devices 104 may be executed such that the beam of radio frequency signal communicated to the first user device 116A from the first repeater device 104A uses the estimated amount of power.

At 318E, an image of a first user (such as the first object 114A) may be acquired from the image-capture device 218 provided in at least one repeater device in the network of repeater devices 104. At 318F, the first user may be identified based on the acquired image. At 318G, a unique identity of the first user may be assigned to the first user device 116A and the first object 114A that are tagged with each other. At 318H, a personalized telecommunication service may be provided to the first user based on the assigned unique identity.

Various embodiments of the disclosure may provide a system (such as the system 100 or the server 102) (FIG. 1). The system 100 includes control circuitry 102A (FIG. 1) that is configured to obtain surrounding environment scan information from each repeater device of the network of repeater devices 104, where the surrounding environment scan information may comprise radar data captured by a radio detection and ranging system provided in each repeater device of the network of repeater devices 104. The control circuitry 102A may be further configured to determine a plurality of signal propagation indicators that includes one or more open areas and one or more blocked areas surrounding each repeater device of the network of repeater devices 104, based on the obtained surrounding environment scan information from each repeater device of the network of repeater devices 104. The control circuitry 102A may be further configured to generate a three-dimensional representation of the geographical area 112 based on the obtained surrounding environment scan information from each repeater device of the network of repeater devices 104 and the determined plurality of signal propagation indicators. The control circuitry 102A may be further configured to track a location and movement of a plurality of user devices 116 in the geographical area 112. The control circuitry 102A may be further configured to select a beamforming scheme from a plurality of beamforming schemes for one or more repeater devices of the network of repeater devices 104 based on the generated three-dimensional representation of the geographical area 112 and the tracked location and movement of the plurality of user devices 116. The control circuitry 102A may be further configured to execute an out-of-band control of operations of the network of repeater devices 104 based on the generated three-dimensional representation, the selected beamforming scheme for the one or more repeater devices, and the tracked location and movement of the plurality of user devices 116 in the geographical area 112.

Various embodiments of the disclosure may provide another system (such as the system 100 or the server 102) (FIG. 1) for controlling the network of repeater devices 104. The system 100 includes control circuitry 102A (FIG. 1) that is configured to obtain surrounding environment scan information from each repeater device of the network of repeater devices 104, where the surrounding environment scan information may comprise radar data captured by a radio detection and ranging system provided in each repeater device of the network of repeater devices 104. The control circuitry 102A may be further configured to determine a plurality of signal propagation indicators that includes one or more open areas and one or more blocked areas surrounding each repeater device of the network of repeater devices 104, based on the obtained surrounding environment scan information from each repeater device of the network of repeater devices 104. The control circuitry 102A may be further configured to generate a three-dimensional representation of the geographical area 112 based on the obtained surrounding environment scan information from each repeater device of the network of repeater devices 104 and the determined plurality of signal propagation indicators. The control circuitry 102A may be further configured to track a location and movement of a plurality of user devices 116 in the geographical area 112. The control circuitry 102A may be further configured to estimate an amount of power to be used to communicate a beam of radio frequency signal to the first user device 116A of the plurality of user devices 116, based on the generated three-dimensional representation of the geographical area 112 and the tracked location and movement of the first user device 116A of the plurality of user devices 116 in the geographical area 112. The control circuitry 102A may be further configured to execute an out-of-band control of operations of the first repeater device 104A of the network of repeater devices 104 such that the beam of radio frequency signal communicated to the first user device 116A from the first repeater device 104A uses the estimated amount of power.

Various embodiments of the disclosure may provide a non-transitory computer-readable medium having stored thereon, computer implemented instruction that when executed by control circuitry in a communication device (e.g. a repeater device) causes the communication device to execute operations similar to the operations disclosed herein in the present disclosure for controlling the network of repeater devices 104.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A system for managing a network of repeater devices, the system comprising:
control circuitry configured to:
obtain data from a repeater device of the network of repeater devices;
determine a plurality of signal propagation indicators that includes one or more open areas surrounding each repeater device of the network of repeater devices, one or more blocked areas surrounding each repeater device of the network of repeater devices, and one or more passive reflectors present in a geographical area, based on the data obtained from the repeater device,
wherein a three-dimensional representation of the geographical area is generated based on the data obtained from the repeater device and the determined plurality of signal propagation indicators, and
wherein the obtained data includes information of movement of a plurality of objects in the geographical area;
track a location and movement of a plurality of user devices in the geographical area;
select a beamforming scheme from a plurality of beamforming schemes for one or more repeater devices of the network of repeater devices based on the generated three-dimensional representation of the geographical area and the movement of the plurality of objects in the geographical area; and
execute an out-of-band control of operations of the network of repeater devices based on the generated three-dimensional representation, the selected beamforming scheme for the one or more repeater devices, the movement of the plurality of objects in the geographical area, and the tracked location and movement of the plurality of user devices in the geographical area.

2. The system according to claim 1, wherein the data is at least one of radar data that is obtained from a radio detection and ranging (RADAR) system provided in each repeater device of the network of repeater devices or lidar data that is obtained from a light detection and ranging (LIDAR) system provided in each repeater device of the network of repeater devices.

3. The system according to claim 2, wherein the control circuitry is further configured to:
tag each user device of the plurality of user devices to a corresponding object of the plurality of objects based on a substantially same location and movement coordinates tracked for each user device of the plurality of user devices and the corresponding object, wherein at least one of the RADAR system or the LIDAR system is configured to track the movement of one or more objects of the plurality of objects.

4. The system according to claim 3, wherein in order to execute the out-of-band control of operations of the network of repeater devices, the control circuitry is further configured to instruct a first repeater device in the network of repeater devices to provide a beam of radio frequency signal to a first object in motion of the plurality of objects further based on the tagging and the acquired tracking information of the movement of the plurality of objects in the geographical area, and wherein the selection of the beamforming scheme for the first repeater device to provide the beam of the radio frequency signal is further based on the tagging and the acquired tracking information of the movement of the plurality of objects in the geographical area.

5. The system according to claim 3, wherein in order to execute the out-of-band control of operations of the network of repeater devices, the control circuitry is further configured to select two or more repeaters in the network of repeaters to concurrently provide beams of radio frequency signals to a second object in motion of the plurality of objects, based on the tagging and the acquired tracking information of the movement of the plurality of objects in the geographical area.

6. The system according to claim 5, wherein in order to execute the out-of-band control of operations of the network of repeater devices, the control circuitry is further configured to instruct the selected two or more repeaters to concurrently provide the beams of radio frequency signals to the second object in motion based on the tagging and the acquired tracking information of the movement of the plurality of objects in the geographical area, wherein concurrent provisioning of the beams of radio frequency signals to the second object in motion causes an increase in data rate of a user device carried by the second object.

7. The system according to claim 1, wherein in order to execute the out-of-band control of operations of the network of repeater devices, the control circuitry is further configured to instruct a first repeater device in the network of repeater devices to provide a beam of radio frequency signal to a first user device of the plurality of user devices based on at least one of the tracked location and movement of the plurality of user devices and the movement of the plurality of objects in the geographical area.

8. The system according to claim 1, wherein in order to execute the out-of-band control of operations of the network of repeater devices, the control circuitry is further configured to instruct two or more repeaters to concurrently provide beams of radio frequency signals to a second user device of the plurality of user devices based on at least one of the tracked location and movement of the plurality of user devices and the movement of the plurality of objects in the geographical area.

9. The system according to claim 1, wherein in order to execute the out-of-band control of operations of the network of repeater devices, the control circuitry is further configured to estimate an amount of power to be used to communicate a beam of radio frequency signal to a first user device of the plurality of user devices based on the generated three-dimensional representation of the geographical area.

10. The system according to claim 1, wherein in order to execute the out-of-band control of operations of the network of repeater devices, the control circuitry is further configured to:
acquire an image of a first user from an image-capture device provided in at least one repeater device in the network of repeater devices;
identify the first user based on the acquired image; and
assign a unique identity of the first user to a first user device and a first object that are tagged with each other.

11. The system according to claim 10, wherein in order to execute the out-of-band control of operations of the network of repeater devices, the control circuitry is further configured to provide a personalized telecommunication service to the first user based on the assigned unique identity.

12. A system for managing a network of repeater devices, the system comprising:
control circuitry configured to:
obtain data from a repeater device of the network of repeater devices;
determine a plurality of signal propagation indicators that includes one or more open areas surrounding each repeater device of the network of repeater devices, one or more blocked areas surrounding each repeater device of the network of repeater devices, and one or more passive reflectors present in a geographical area, based on the data obtained from the repeater device;
wherein a three-dimensional representation of the geographical area is generated based on the data obtained from the repeater device and the determined plurality of signal propagation indicators, and
wherein the obtained data includes information of movement of a plurality of objects in the geographical area;
track a location and movement of a plurality of user devices in the geographical area;
estimate an amount of power to be used to communicate a beam of radio frequency signal to a first user device of the plurality of user devices, based on the generated three-dimensional representation of the geographical area and the movement of the plurality of objects in the geographical area; and
execute an out-of-band control of operations of a first repeater device of the network of repeater devices such that the beam of radio frequency signal communicated to the first user device from the first repeater device uses the estimated amount of power.

13. A method for managing a network of repeater devices, the method comprising:
obtaining, by a server, data from a repeater device of the network of repeater devices;
determining, by the server, a plurality of signal propagation indicators that includes one or more open areas surrounding each repeater device of the network of repeater devices, one or more blocked areas surrounding each repeater device of the network of repeater devices, and one or more passive reflectors present in a geographical area, based on the obtained data;
wherein a three-dimensional representation of the geographical area is generated based on the obtained data and the determined plurality of signal propagation indicators, and
wherein the obtained data includes information of movement of a plurality of objects in the geographical area;
tracking, by the server, a location and movement of a plurality of user devices in the geographical area;
selecting, by the server, a beamforming scheme from a plurality of beamforming schemes for one or more repeater devices of the network of repeater devices based on the generated three-dimensional representation of the geographical area and the movement of the plurality of objects in the geographical area; and
executing, by the server, an out-of-band control of operations of the network of repeater devices based on the generated three-dimensional representation, the selected beamforming scheme for the one or more repeater devices, the movement of the plurality of objects, and the tracked location and movement of the plurality of user devices in the geographical area.

14. The method according to claim 13, wherein the data is at least one of radar data that is obtained from a radio detection and ranging (RADAR) system provided in each repeater device of the network of repeater devices or lidar data that is obtained from a light detection and ranging (LIDAR) system provided in each repeater device of the network of repeater devices.

15. The method according to claim 14, further comprising:
tagging, by the server, each user device of the plurality of user devices to a corresponding object of the plurality of objects based on a substantially same location and movement coordinates tracked for each user device of the plurality of user devices and the corresponding object, wherein at least one of the RADAR system or the LIDAR system is configured to track the movement of one or more objects of the plurality of objects.

16. The method according to claim 15, wherein the executing of the out-of-band control of operations of the network of repeater devices further comprises instructing, by the server, a first repeater device in the network of repeater devices to provide a beam of radio frequency signal to a first object in motion of the plurality of objects further based on the tagging and the acquired tracking information of the movement of the plurality of objects in the geographical area, and wherein the selection of the beamforming scheme for the first repeater device to provide the beam of the radio frequency signal is further based on the tagging and the acquired tracking information of the movement of the plurality of objects in the geographical area.

17. The method according to claim 15, wherein the executing of the out-of-band control of operations of the network of repeater devices further comprises selecting, by the server, two or more repeaters in the network of repeaters to concurrently provide beams of radio frequency signals to a second object in motion of the plurality of objects, based on the tagging and the acquired tracking information of the movement of the plurality of objects in the geographical area.

18. The method according to claim 17, wherein the executing of the out-of-band control of operations of the network of repeater devices further comprises instructing, by the server, the selected two or more repeaters to concurrently provide the beams of radio frequency signals to the second object in motion based on the tagging and the acquired tracking information of the movement of the plurality of objects in the geographical area, wherein concurrent provisioning of the beams of radio frequency signals to the second object in motion causes an increase in data rate of a user device carried by the second object.

19. The method according to claim 13, wherein the executing of the out-of-band control of operations of the network of repeater devices further comprises instructing, by the server, a first repeater device in the network of repeater devices to provide a beam of radio frequency signal to a first user device of the plurality of user devices based on at least one of the tracked location and movement of the plurality of user devices and the movement of the plurality of objects in the geographical area.

20. A non-transitory computer-readable medium having stored thereon, computer-executable instructions, which when executed by control circuitry, caused the control circuitry to execute instructions, the instructions comprising:
   obtaining, by a server, at least one of radar data and lidar data from a repeater device of the network of repeater devices;
   determining, by the server, a plurality of signal propagation indicators that includes one or more open areas surrounding each of the repeater device of the network of repeater devices, one or more blocked areas surrounding each of the repeater device of the network of repeater devices, and one or more passive reflectors present in a geographical area, based on the obtained at least one of radar data and lidar data,
   wherein a three-dimensional representation of the geographical area is generated based on the obtained at least one of radar data and lidar data and the determined plurality of signal propagation indicators;
   tracking, by the server, a location and movement of a plurality of user devices in the geographical area;
   acquiring tracking information of movement of a plurality of objects in the geographical area based on the obtained at least one of radar data or lidar data;
   selecting, by the server, a beamforming scheme from a plurality of beamforming schemes for one or more repeater devices of the network of repeater devices based on the generated three-dimensional representation of the geographical area and the movement of the plurality of objects in the geographical area; and
   executing, by the server, an out-of-band control of operations of the network of repeater devices based on the generated three-dimensional representation, the selected beamforming scheme for the one or more repeater devices, the movement of the plurality of objects in the geographical area, and the tracked location and movement of the plurality of user devices in the geographical area.

* * * * *